United States Patent

Muchow et al.

[11] 3,977,438
[45] Aug. 31, 1976

[54] MEANS TO RESET AN ACTUATOR PILOT VALVE

[75] Inventors: John D. Muchow, Cerritos; Harry R. Cove, Huntington Beach, both of Calif.

[73] Assignee: Willis Oil Tool Co., Long Beach, Calif.

[22] Filed: Oct. 2, 1975

[21] Appl. No.: 618,735

[52] U.S. Cl. .................. 137/625.66; 137/625.27; 137/625.68
[51] Int. Cl.² ................................ F16K 17/00
[58] Field of Search ....... 137/625.6, 625.68, 625.66, 137/625.27

[56] References Cited
UNITED STATES PATENTS

| | | | |
|---|---|---|---|
| 3,610,284 | 10/1971 | Spencer | 137/625.66 |
| 3,874,414 | 4/1975 | Dollison | 137/625.66 |
| 3,877,484 | 4/1975 | Theriot | 137/625.66 |

*Primary Examiner*—Harold W. Weakley
*Attorney, Agent, or Firm*—Paul A. Weilein

[57] ABSTRACT

Reset means to advance a valve spool from a first valve seat to a second valve seat in opposition to exceedingly high biasing fluid pressure comprises a manually rotatable actuating means in screw threaded engagement with the body of the pilot valve. With the manually operable actuator at its retracted position, means is manually operated to operatively connect the manual actuator to the valve spool to permit advance of the manual actuator to drive the valve spool from the first valve seat to the second valve seat against the resistance of the biasing fluid pressure. In consequence of the advance of the valve spool to the second valve seat, an opposite fluid pressure progressively rises to a normal operating range at which it dominates the biasing fluid pressure to hold the spool against the second valve seat independently of the manual actuator and this rise of the opposite fluid pressure to the normal operating range automatically releases the connecting means to give the valve spool freedom for subsequent retraction by the biasing fluid pressure in the event that the dominating fluid pressure falls below its normal operating range.

20 Claims, 6 Drawing Figures

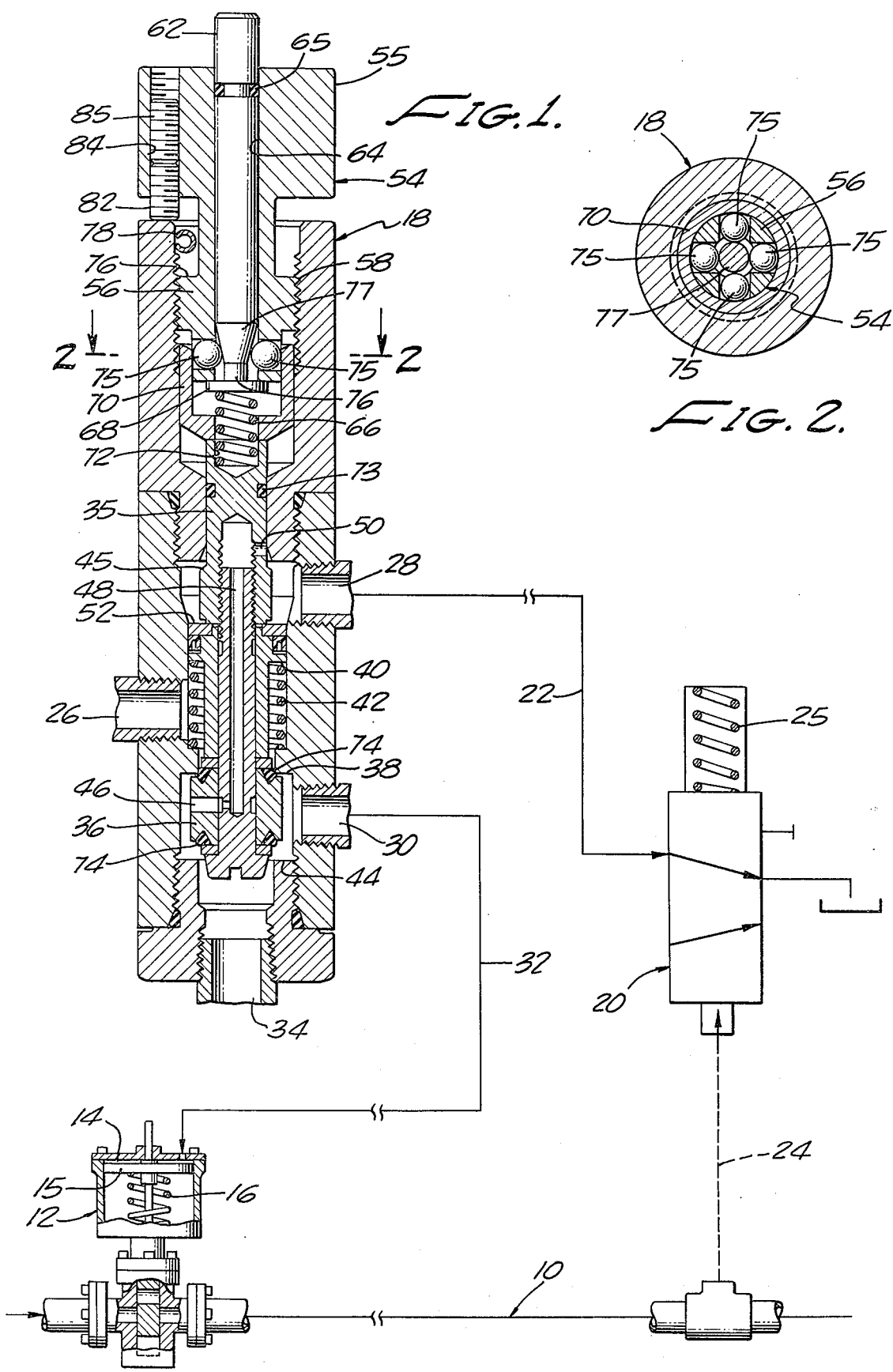

MEANS TO RESET AN ACTUATOR PILOT VALVE

BACKGROUND OF THE INVENTION

This invention relates to an actuator pilot valve and more specifically is directed to the problem of manually resetting the actuator pilot valve in opposition to a biasing fluid pressure of high magnitude.

In oil field practice an actuator pilot valve in cooperation with a monitor pilot valve is commonly employed to automatically close a shut-off valve in a fluid pipeline when the pressure in the pipeline departs from a normal operating range. In some instances the shut-off valve is closed automatically only when an unduly high pressure surge occurs in the pipeline. In other instances the shut-off valve is closed automatically when the pressure in the pipeline drops below the normal pressure range, for example, when the pipeline is ruptured. In other instances, flow is cut off automatically in the pipeline either when the pressure rises unduly or when the pressure falls unduly.

In such a control system the shut-off valve has a control cylinder to which pressurized control fluid may be applied by the actuator pilot to hold the shut-off valve open in opposition to spring pressure. Venting the control cylinder causes the shut-off valve to be closed promptly by spring pressure. The monitor pilot senses the pressure in the pipeline downstream from the shut-off valve and when the pipeline pressure departs unduly from the normal pressure range, the monitor pilot vents the actuator pilot and the actuator pilot in turn vents the control cylinder of the shut-off valve to close the shut-off valve.

An actuator pilot of the type to which the present invention relates has a valve spool which is continuously subjected to a biasing fluid pressure which tends to retract the valve spool against a first valve seat, but when the actuator pilot is in service with the pipeline operating in its normal pressure range an opposite fluid pressure dominates the biasing fluid pressure to keep the valve spool advanced against a second valve seat. When the valve spool is against the second valve seat, the actuator pilot supplies pressure to the control cylinder of the shut-off valve to keep the shut-off valve open. When a departure from the normal pressure range in the pipeline occurs and the monitor pilot reacts by venting the actuator pilot, the dominating pressure against the valve spool drops to permit the biasing fluid pressure to retract the valve spool against the first valve seat to cut off control fluid from the control cylinder of the shut-off valve and at the same time to vent the control cylinder to cause the shut-off valve to close.

Once the cause for the departure of the pipeline pressure from the normal pressure range has been discovered and corrected, the actuator pilot is reset by manually advancing the valve spool from the first valve seat to the second valve seat in opposition to the biasing fluid pressure and to complete the resetting operation the valve spool is manually held at its advanced position until the pipeline pressure rises to the normal range with consequent creation of dominating fluid pressure in the actuator pilot to keep the valve spool advanced against the second valve seat in opposition to the constant biasing fluid pressure.

If the pipeline pressure is under 250 p.s.i.g., a single source of control fluid under correspondingly low pressure may be employed for the whole control system because it is no problem to reset the actuator pilot against relatively low biasing fluid pressure by finger pressure or by means of a simple lever. If the pipeline is under relatively high pressure, for example a pressure of 3,000 p.s.i.g., correspondingly high control pressure is required to open the safety shut-off valve. Unfortunately, however, manually resetting an actuator pilot against such high biasing fluid pressure requires a manual thrust of too high magnitude to be accomplished by finger pressure or by means of a simple lever. Consequently, it has heretofore been necessary in the control system for a high pressure pipeline to provide a second source of low pressure control fluid for the actuator pilot. Obviously, it would be highly desirable to solve the problem of manually resetting an actuator pilot against high biasing fluid pressure thereby to make it possible to employ a single high pressure source of control pressure instead of two sources at different pressures.

SUMMARY OF THE INVENTION

One object of the invention is to provide a manually operable reset mechanism capable of exerting a thrust of several hundred pounds against the valve spool of an actuator pilot as may be required to advance the spool against a biasing fluid pressure of high magnitude. This object is attained by providing a reset actuator in the form of a manually operable screw in threaded engagement with the body of the pilot valve. With the cooperating screw threads at relatively low pitch, only a moderate manual turning force applied to the screw results in the required high magnitude thrust against the valve spool.

Another object of the invention is to prevent the advanced reset actuator from interfering with subsequent freedom of the valve spool to be retracted to the first valve seat by the biasing fluid pressure during the subsequent service state of the actuator pilot. For this purpose the valve spool is operatively connected to the reset actuator at the retracted position of the actuator to permit the actuator to advance the valve spool and then when the pressure in the pipeline is restored to the normal pressure range and consequent fluid pressure in the actuator pilot dominates the biasing fluid pressure, the valve spool is automatically released from the reset actuator to leave the advanced valve spool completely mechanically independent of the advanced reset actuator.

A more specific object of the invention is to provide releasable connecting means that is sufficiently sophisticated to release the valve spool in response to the rise in the normal dominating fluid pressure in the actuator pilot.

The releasable connecting means includes a plurality of elements which preferably are in the form of steel balls and which may be expanded or spread out from inner release positions to outer effective connecting positions. An axial pin slidingly mounted in the reset actuator is normally held at an outer protruding position by an axial spring and may be depressed by finger pressure to spread the plurality of balls to their outer effective positions. A portion of the axial pin is of reduced diameter to permit the balls to move inward to their release positions. Another portion of the axial pin is a conical wedge that spreads the balls to their effective positions in response to depression of the axial pin. The remaining portion of the axial pin is of enlarged diameter to maintain the steel balls in their outer effective positions.

With the reset actuator retracted to an outer limit position and with the small diameter portion of the axial pin positioned to permit the balls to take their inner release positions, the axial pin may be depressed by finger pressure against the resistance of the axial spring to spread the balls apart and to bring the large diameter portion of the axial pin into the region of the spread balls to keep them from contracting to their release positions.

With the balls spread apart, initial advance of the actuator encounters the resistance of the biasing fluid pressure against the advancing valve spool to cause the balls to be clamped between the actuator and a rim of the valve spool. The rim is beveled to cam the balls inwardly against the large diameter portion of the axial pin. Consequently, the cam action of the rim of the valve spool causes the steel balls to grip the large diameter portion of the axial pin to keep the axial pin retracted in opposition to the axial spring as long as the interposed steel balls transmit thrust from the manual actuator to the valve spool.

A resilient sealing ring is employed to cooperate with the second valve seat and the invention takes advantage of the resiliency of the sealing ring to provide for automatic release of the valve spool in response to the rise of the normal dominating fluid pressure. For this purpose screw threaded adjustable stop means limits the advance of the reset actuator at a position where the advanced valve spool makes effective contact with the second valve seat but does not unduly compress the resilient sealing ring. When the dominating fluid pressure is established to hold the valve spool against the second valve seat, the dominating fluid pressure advances the valve spool against the resilient sealing ring by an additional small increment away from the stopped reset actuator and this small additional fluid-pressure actuated advance of the valve spool is sufficient to unclamp the steel balls and thus relieve the depressed axial pin from the grip of the steel balls. The release of the axial pin permits the axial spring to retract the axial pin to its normal protruding position where in the small diameter portion of the axial pin permits the steel balls to be shifted to their inner release positions by the cam action of the beveled rim of the spool. With the steel balls at their inner positions the valve spool is completely mechanically independent of the advanced reset actuator and is free to be retracted against the first valve seat by the constant biasing pressure in the event that departure from the normal range of the pipeline pressure causes the dominating pressure in the actuator pilot to be terminated.

The advanced reset actuator does not block retraction of the valve spool to the first valve seat and therefore the reset actuator may be left at its advanced position until it is again necessary to reset the actuator pilot. At that time the reset actuator is again retracted to its outer limit position and the axial pin is again depressed to spread the balls in preparation for again operatively connecting the retracted valve spool to the retracted reset actuator.

The various features and advantages of the invention may be understood from the following detailed description together with the accompanying drawings.

BRIEF DESCRIPTION OF THE DRAWINGS

In the drawings, which are to be regarded as merely illustrative:

FIG. 1 is a largely diagrammatic view of a control system for a high pressure pipeline wherein an actuator pilot equipped with the reset mechanism of the present invention cooperates with a monitor pilot to control a shut-off valve in the pipeline, the actuator pilot being shown in its stand-by state ready to be reset to place the control system in service;

FIG. 2 is a transverse section along the line 2—2 of FIG. 1 showing the four connecting balls retracted to their release positions;

DESCRIPTION OF THE PRESENTLY PREFERRED EMBODIMENT OF THE INVENTION

Figure 3:
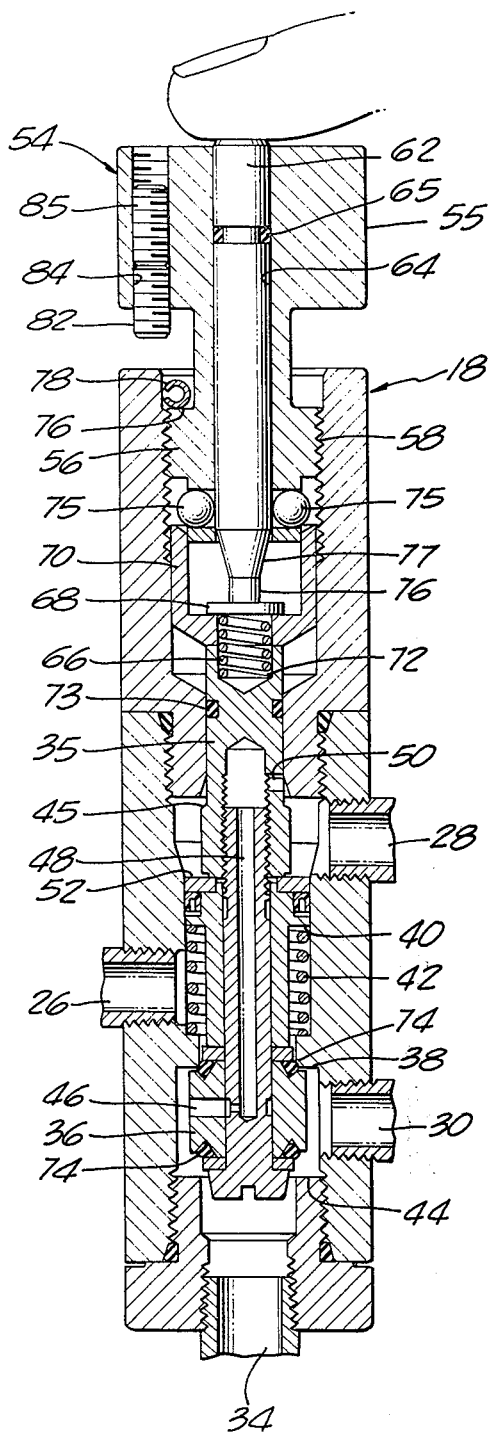
FIG. 3 is a longitudinal sectional view of the actuator pilot illustrating the first step in the resetting operation.

In FIG. 1, flow through a high pressure oil pipeline 10 having a normal pressure range in the neighborhood of 3,000 p.s.i.g. is controlled by a shut-off valve 12 that has a control cylinder 14 wherein hydraulic control fluid at approximately 3,000 p.s.i.g. may act against a piston 15 to open the shut-off valve in opposition to a spring 16. The control system for the shut-off valve 12 comprises an actuator pilot generally designated 18 and a cooperating monitor pilot generally designated 20.

The monitor pilot 20 is shown diagrammatically as a pressure responsive valve which at the position shown in FIG. 1 vents a bleed line 22 to the atmosphere and at its alternate position cuts off the bleed line. As indicated by the dotted line 24, the monitor pilot is in fluid pressure communication with the pipeline 10 downstream from the shut-off valve 12, the pressure from the connection 24 acting against spring means 25. The monitor pilot may also be of the conventionally known type which is arranged to open the bleed line 22 to vent the actuator pilot 18 either in the event that the pressure in the pipeline 10 drops below the normal operating range or in the event that the pressure in the pipeline 10 climbs above the normal operating range. In some installations, the monitor pilot may be designed to respond only to excessive rise in the pressure in the pipeline 10 and in other installations the monitor valve may be designed to respond only to drop in pressure in the pipeline 10 below the normal operating range.

The body of the actuator pilot 18 has four ports, namely, a supply port 26 in communication with a suitable source (not shown) of hydraulic control fluid having a pressure of approximately 3,000 p.s.i.g.; a pilot port 28 connected to the bleed line 22; a cylinder port 30 connected by a line 32 to the control cylinder 14 of the shut-off valve 12; and an exhaust port 34 which is open to the atmosphere. The central portion of the exterior of a valve spool 35 is in constant communication with the supply port 26 to permit the control fluid to act against differential areas of the valve spool to constantly urge the valve spool to the retracted position shown in FIG. 1 where a head 36 of the valve spool is retracted upward against a first valve seat 38. The differential area against which the control fluid acts includes a downwardly facing circumferential shoulder 40 of the valve spool and a suitable coil spring 42 acts against this shoulder to cooperate with the biasing fluid pressure.

In the stand-by state of the actuator pilot shown in FIG. 1, the retraction of the valve spool against the upper valve seat 38 places the line 32 to the shut-off valve control cylinder 14 in communication with the exhaust port 34 to vent the control cylinder and thus causes the shut-off valve to close. At the same time, the valve spool cuts off flow of control fluid to the bleed line 22 that leads to the monitor pilot 20.

Figure 4:
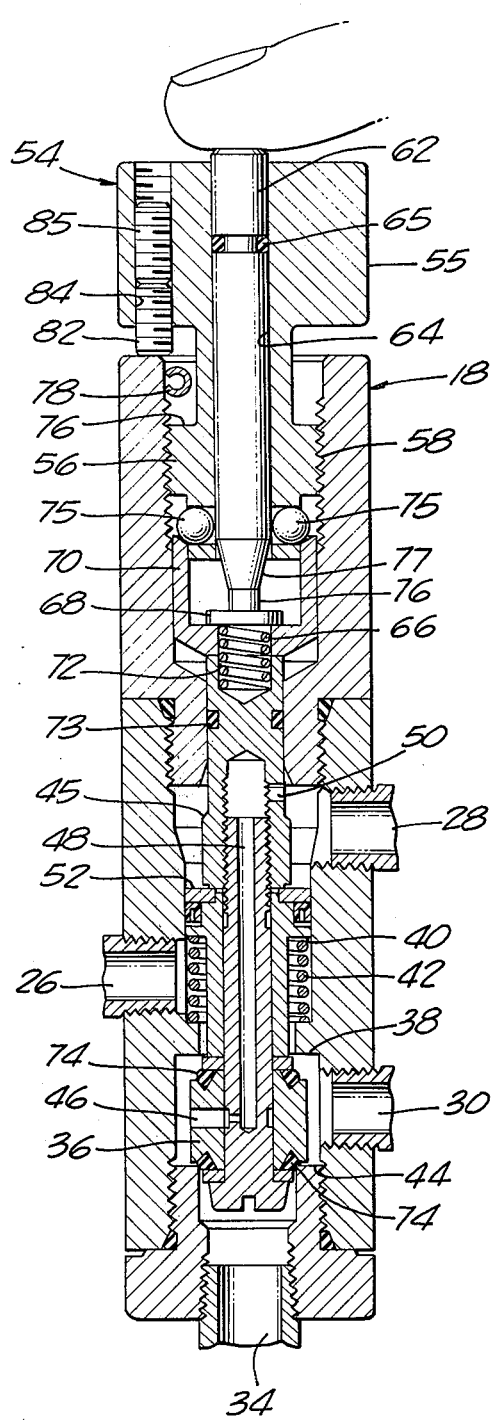
FIG. 4 is a similar sectional view illustrating the second step in the resetting operation.

When the cause of the departure of the pressure in pipeline 10 from the normal operating range has been discovered and corrected, the actuator pilot may be reset to restore the control system to service by simply manually advancing the valve spool to its second position shown in FIG. 4 where the head 36 of the valve spool makes sealing contact with a second lower valve seat 44. The advance of the valve spool to the second valve seat 44 shuts off exhaust port 34 and places the control fluid in communication with both the pilot port 28 and the cylinder port 30 to cause the control fluid to open the shut-off valve 12. As long as the monitor pilot is in its venting position shown in FIG. 1, the control fluid that is supplied to the bleed line 22 is vented to the atmosphere. In the resetting operation, the valve spool of the actuator pilot must be mechanically retained at its advanced lower position until flow through the shut-off valve brings the pressure in the pipeline 10 up to the normal operating range whereupon the monitor pilot responds by closing off the bleed line 22.

Figure 5:
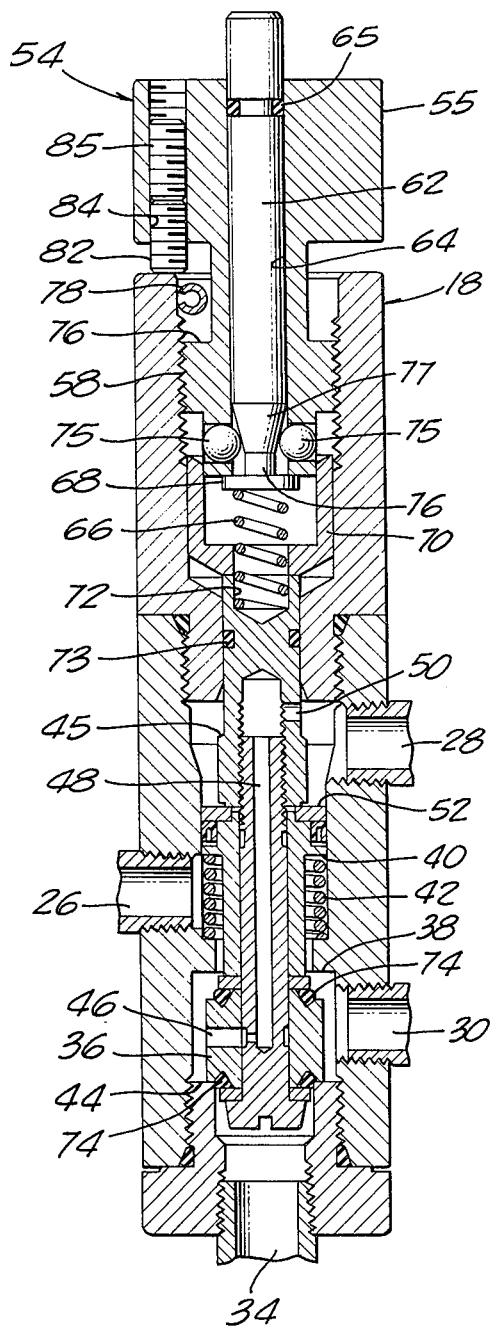
FIG. 5 is a similar sectional view illustrating the release of the valve spool by dominating fluid pressure in the actuator pilot.

With the final rise of the pressure in the pipeline 10, the actuator pilot is in service as shown in FIG. 5 wherein a static condition exists with substantially no flow through the cylinder port 30 to the control chamber of the shut-off valve and substantially no flow occurs through the pilot port 28 to the bleed line 22 because the monitor pilot cuts off the bleed line. The full pressure of the control fluid is now conveyed through an internal passageway of the valve spool to an outer differential area against which the control fluid acts, which includes an upwardly facing circumferential shoulder 52 of the valve spool and an outwardly facing circumferential O-ring seal 73 of the valve spool and which tends to advance the valve spool.

The internal passage includes a radial bore 46 in the head 36 of the valve spool, an axial bore 48 and a second radial bore 50 in the region of the pilot port 28. The full pressure of the control fluid against the outwardly facing circumferential seal 73 and against a lower larger circumferential shoulder 52 dominates the previously mentioned biasing fluid pressure and keeps the valve spool seated against the lower valve seat as long as the pressure in the pipeline 10 remains in its normal operating range.

Figure 6:
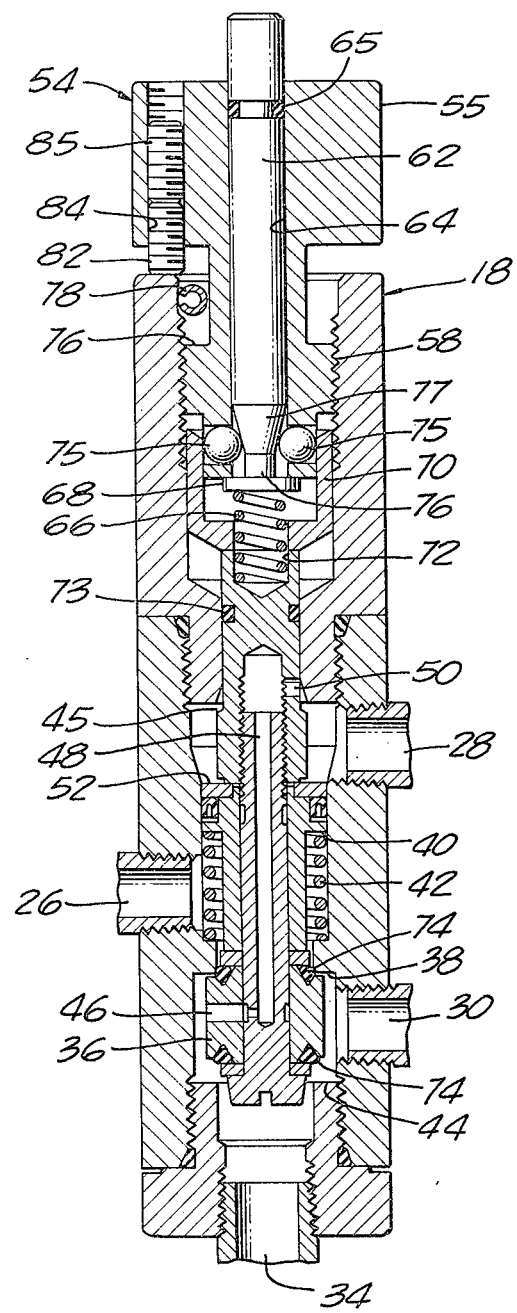
FIG. 6 is a similar sectional view showing how venting of the actuator pilot by the monitor pilot causes the actuator pilot to resume its stand-by state.

When a departure from the normal range of pressures in the pipeline 10 causes the monitor pilot 20 to vent the actuator pilot 18 through the bleed line 22, the consequent lowering of the dominating fluid pressure permits the constant biasing fluid pressure acting on the intermediate portion of the exterior of the valve spool to shift the valve spool back to its first position against the upper valve seat 38 as shown in FIG. 6, the valve spool now being in the same position as in FIG. 1. In FIG. 6 the exhaust port 34 is in communication with the cylinder port 30 to vent the control cylinder 14 of the shut-off valve and thus cause the shut-off valve to be closed by the spring 16. At the same time, the monitor pilot bleeds the pilot port 28 of the actuator pilot to the atmosphere to terminate the dominating fluid pressure against the upper portion of the valve spool.

Turning now to the present invention, the reset mechanism includes a manual reset actuator, generally designated 54 which has a knurled knob or operating handle 55 and a lower body 56 that has an external screw thread 58 in engagement with an internal screw thread of the body of the actuator pilot. An axial pin 62 slidingly mounted in an axial bore 64 of the manual actuator is sealed by an O-ring 65 and normally protrudes from the upper end of the manual actuator, as shown in FIG. 1, under the pressure of an axial spring 66 that acts against an enlargement 68 of the inner end of the axial pin. The upper or trailing end of the valve spool 35 is shaped to form a cup 70 and the axial spring 66 seats in a well 72 at the bottom of the cup. The valve spool is embraced by the O-ring 73 to prevent upward leakage of the control fluid and is also embraced by resilient seals in the form of O-rings 74 to cooperate with the two valve seats 38 and 44 respectively.

The means for operatively connecting the valve spool 35 to the reset actuator 54 comprises elements in the form of four steel balls 75 which, as shown in FIG. 2, are mounted in four corresponding radial bores of the reset actuator 54. The axial pin 62 is formed with a lower end portion 76 of relatively small diameter which is connected by a conical wedge 77 to an upper enlarged portion of the pin having the full diameter permitted by the axial bore 64. In the position shown in FIG. 1, the conical wedge 77 permits the group of balls 75 to contract radially inward to release the valve spool from the reset actuator. The conical wedge 77 is shaped and dimensioned to spread the four balls 75 to their effective connecting positions on the enlarged portion of the pin 62 as shown in FIG. 3.

The first step in the resetting operation as illustrated by FIG. 3 is to unscrew the reset actuator 54 to retract the reset actuator to its outer limit positions where a radial shoulder 76 of the body 56 abuts a tangential stop pin 78 that is mounted on the body of the actuator pilot. With the reset actuator 54 retracted to its outer limit position, the axial pin 62 is depressed by finger pressure to spread the steel balls to their effective connecting positions as shown in FIG. 3, and then the reset actuator is screwed inwardly to transmit thrust through the steel balls to the rim of the cup 70 at the trailing end of the valve spool. The rim of the cup 70 is formed with an inward bevel, as shown, which cams the steel balls radially inwardly in response to the thrust of the reset actuator against the valve spool in opposition to the biasing fluid pressure with the result that the four balls grip the large diameter portion of the axial pin, as shown in FIG. 4, to hold the axial pin against retraction by the axial spring 66. The axial pin will then remain depressed in opposition to the axial spring 66. It is to be noted that at this point the valve spool has been initially advanced by the reset actuator only a slight extent to encounter the upward biasing pressure of the control fluid to provide the clamping force on the steel balls that causes the steel balls to grip the axial pin 62.

The next step in the resetting operation which is illustrated by FIG. 4 is to advance the reset actuator 54 by screw action to advance the valve spool against the resistance of the biasing pressure until the head 36 of the valve spool compresses the lower sealing ring 74 sufficiently against the lower valve seat 44 to effectively seal off the exhaust port 34 of the actuator pilot.

To be sure that the lower sealing ring 74 is not significantly compressed beyond the degree required to effect the desired seal, suitable stop means is provided to limit the advance of the reset actuator 54. For this purpose a stop screw 82 protrudes downwardly from a threaded bore 84 of the reset actuator for abutment against the upper end of the body of the actuator pilot. Once the stop screw 82 is correctly adjusted, it is secured at its adjusted position by a lock screw 85. At this time the resiliency of the lower sealing ring 74 will permit the valve spool to advance further by a small increment, of the order of 0.010 inch, if additional advancing force is applied to the valve spool.

When the monitor pilot cuts off the bleed line 22 in response to rise of the pressure in the pipeline 10 to the normal pressure range, the previously mentioned dominating fluid pressure is created in the actuator pilot 18 and rises to a normal maximum in the region of the pilot port 28 to advance the valve spool by the increment of 0.010 inch against the resistance of the biasing fluid pressure. With the reset actuator stationay at its stopped position, the additional increment of advance of the valve spool slightly increases the distance or gap between the reset actuator and the rim of the valve spool to free the balls 75 from the cam action by the beveled rim of the valve spool with the consequence that the four steel balls loosen their grip on the axial pin 62 to permit the axial spring 66 to thrust the axial pin upward to its normal protruding position shown in FIG. 1. The actuator pilot 18 is now in its service state as previously explained with reference to FIG. 5.

Since the valve spool is unlatched from the advanced reset actuator, the valve spool is now free for retraction against the upper valve seat 38 by the biasing fluid pressure in the event that a departure from the normal pressure range of the fluid in the pipeline 10 causes the monitor pilot to vent the actuator pilot and thus terminate the previously mentioned dominating fluid pressure. When the dominating fluid pressure is removed, the valve spool retracts to its stand-by position shown in FIG. 1 with the upper sealing ring 74 compressed against the upper valve seat 38.

The above description of the invention in specific detail will suggest various changes, substitutions and other departures from the disclosure within the spirit and scope of the appended claims.

We claim:

1. A reset mechanism incorporated in an actuator pilot that has a body with a valve member therein, wherein a reset operation comprises advancing the valve member manually against biasing fluid pressure from a retracted position against a first valve seat to an advanced position against a second valve seat and then holding the valve member against the second valve seat until an opposite fluid pressure rises to dominate the biasing fluid pressure to keep the valve member against the second valve seat,
comprising:
a manually operable reset actuator movable from a retracted position to force the valve member from the first valve seat to the second valve seat;
means to releasably operatively connect the valve member to the reset actuator at the retracted position of the actuator to permit advance of the actuator to advance the valve member against the second valve seat; and
means to release the advanced valve member from the advanced reset actuator when said opposite fluid pressure rises to maintain the valve member against the second valve seat by dominating said biasing fluid pressure.

2. A reset mechanism as set forth in claim 1 which includes means to retract the advanced valve member in response to the termination of the dominating fluid pressure.

3. A reset mechanism as set forth in claim 1 in which the reset actuator is a screw means in screw threaded engagement with said pilot body to produce an advancing force of high magnitude in response to a manual input force of relatively low magnitude.

4. A reset mechanism as set forth in claim 1 in which said releasable connecting means is carried by the reset actuator.

5. A reset mechanism as set forth in claim 1 in which said releasable connecting means includes a plurality of elements and manual means to spread the plurality of elements to outer effective positions.

6. A reset mechanism as set forth in claim 5 in which one of said reset actuator and said valve member is shaped to cam the plurality of elements inward from their outer effective positions.

7. A reset mechanism as set forth in claim 5 in which said manual means is a tapered axial pin slidably mounted in the reset actuator, said pin being manually movable from an outer protruding position to an inner position to spread the plurality of elements.

8. A reset mechanism as set forth in claim 7 which includes spring means to bias the axial pin towards its outer position.

9. A reset mechanism as set forth in claim 6 in which said valve member has a circumferential rim for engagement by the plurality of elements;
and in which said rim is inwardly tapered for cam action against the plurality of elements to contract the plurality of latch elements against said axial pin.

10. A reset mechanism as set forth in claim 1 in which the releasable connecting means includes a plurality of elements movable radially from inner release positions to outer effective positions;
which includes an axial pin manually movable from an outer position to an inner position;
in which the axial pin has a wedge portion to spread the latch elements to their outer effective positions when the axial pin is moved to its inner position;
which includes spring means to bias the axial pin to its outer position; and
in which one of said reset actuator and said valve member is shaped for cam action on the plurality of elements to urge the elements radially inwardly against the axial pin when the elements are in their effective positions thereby to cause the elements to grip the axial pin and hold the axial pin advanced in opposition to said spring means.

11. A reset mechanism as set forth in claim 1 which includes a seal effective at said second valve seat for compression by the advanced valve member;
which includes stop means to limit the advance of the reset actuator at a point where the valve member is advanced to a given position to compress said seal to a given degree for effective sealing action;
in which the seal is sufficiently resilient to permit the valve member to be advanced by a given increment beyond said given position independently of the reset actuator;

in which said rise of the dominating fluid pressure advances the valve member by said given increment;

and in which the incremental advance of the valve member releases said connecting means to free the valve member for retraction independently of the reset actuator.

12. A reset mechanism as set forth in claim 11 in which said connecting means at its effective position is extended to a position between the reset actuator and the valve member to transmit force from the reset actuator to the valve member to advance the valve member;

in which means urges retraction of the connecting means to its release position;

in which the resistance of the biasing fluid pressure to the advance of the valve member causes the connecting means to be clamped between the reset actuator and the valve member to resist said urging means;

and in which said incremental advance of the valve spool terminates the clamping of the connecting means to permit said urging means to retract the connecting means.

13. A reset mechanism as set forth in claim 12 in which the connecting means comprises a plurality of balls.

14. A reset mechanism as set forth in claim 13 in which the balls are mounted in corresponding radial bores in the reset actuator.

15. A reset mechanism as set forth in claim 14 which includes:

an axial member slidingly mounted in the reset actuator and movable by finger pressure from a retracted position to an advanced position to cam the balls to their effective positions; and spring means urging retraction of the axial member, one of said reset actuator and the valve member having a cam surface to urge the balls inward against said axial member to hold the axial member retracted as long as the balls are clamped between the reset actuator and the valve member.

16. A reset mechanism as set forth in claim 11 in which said stop means is screw means adjustably mounted in one of said reset actuator and said body to abut the other of said reset actuator and said body.

17. A reset mechanism as set forth in claim 16 which includes a lock screw in said one of the reset actuator and said body to hold said screw means at an adjusted position.

18. A reset mechanism as set forth in claim 1 in which an area of a given magnitude of the valve member is exposed to said biasing fluid pressure;

and in which an area of larger magnitude of the valve member is exposed to said dominating fluid pressure.

19. A reset mechanism as set forth in claim 18, in which control fluid provides the dominating fluid pressure;

and in which the valve member cooperates with said first valve seat to cut off the control fluid from said area of larger magnitude.

20. A reset mechanism as set forth in claim 1, in which the connecting means at its effective position is interposed between the reset actuator and the valve member to transmit force from the reset actuator to the valve member.

* * * * *